(12) United States Patent
Xue et al.

(10) Patent No.: US 12,733,660 B2
(45) Date of Patent: Sep. 15, 2026

(54) PRECISION TEMPERATURE AND MOISTURE CONTENT CONTROL FOR BATCH FOOD PRODUCTION USING A VACUUM SYSTEM

(71) Applicant: Blentech Corporation, Santa Rosa, CA (US)

(72) Inventors: Zhengjun Xue, Santa Rosa, CA (US); Keith Weerts, Santa Rosa, CA (US); Daniel Voit, Santa Rosa, CA (US)

(73) Assignee: Blentech Corporation, Santa Rosa, CA (US)

( * ) Notice: Subject to any disclaimer, the term of this patent is extended or adjusted under 35 U.S.C. 154(b) by 195 days.

(21) Appl. No.: 18/912,511

(22) Filed: Oct. 10, 2024

(65) Prior Publication Data

US 2025/0113845 A1 Apr. 10, 2025

Related U.S. Application Data

(60) Provisional application No. 63/589,188, filed on Oct. 10, 2023.

(51) Int. Cl.

| | |
|---|---|
| ***A23L 5/10*** | (2016.01) |
| ***A23B 2/00*** | (2025.01) |
| ***A23B 2/80*** | (2025.01) |
| ***G01G 19/52*** | (2006.01) |
| ***G05D 22/02*** | (2006.01) |
| ***G05D 23/19*** | (2006.01) |

(52) U.S. Cl.

CPC ................ *A23L 5/17* (2016.08); *A23B 2/001* (2025.01); *A23B 2/805* (2025.01); *G01G 19/52* (2013.01); *G05D 22/02* (2013.01); *G05D 23/1917* (2013.01)

(58) Field of Classification Search

CPC ... A23L 5/17; A23L 5/13; A23B 2/001; A23B 2/805; G01G 19/52; G05D 22/02; G05D 23/1917; G05D 27/02

See application file for complete search history.

(56) References Cited

U.S. PATENT DOCUMENTS 2,203,638 A 6/1940 Smaltz et al.
3,176,408 A * 4/1965 Fuentevilla ............... F26B 5/06 34/92
3,304,733 A * 2/1967 Coffman ............... A23B 2/805 426/524
4,421,020 A * 12/1983 Gross .................... A23B 2/103 366/139

(Continued)

*Primary Examiner* — Drew E Becker

(74) *Attorney, Agent, or Firm* — Andrew F. Young, Esq.; NOLTE LACKENBACH SIEGEL

(57) ABSTRACT

An apparatus, system, and method for a precision temperature and moisture content control for batch food production using an agitated and jacketed vessel equipped with a multi-stage and balanced vacuum system, an outboard heat exchanger system indirectly heats the vessel and accompanying, weighing, sensing, and controlling devices. A condensate collection and weight system is interlinked with processing control so as to allow a vacuum level within the system to be precisely controlled based on the weighing system to allow moisture removal and prevent overcooking in an automated vacuum cooling process, a vacuum cooking process, or a combination of a vacuum cooling and a vacuum cooking process.

5 Claims, 6 Drawing Sheets

(56) References Cited

U.S. PATENT DOCUMENTS

| | | | | |
|---|---|---|---|---|
| 4,615,178 | A * | 10/1986 | Badenhop | A23B 2/103<br>62/169 |
| 5,290,580 | A | 3/1994 | Floyd et al. | |
| 5,386,703 | A * | 2/1995 | Later | A23B 2/103<br>62/264 |
| 5,992,169 | A | 11/1999 | Later | |
| 7,012,229 | B2 | 3/2006 | Kim | |
| 8,047,128 | B2 | 11/2011 | Salvaro | |
| 2009/0169694 | A1* | 7/2009 | Fleisch | A23B 2/708<br>426/465 |
| 2010/0159112 | A1* | 6/2010 | Madsen | A23L 19/09<br>99/472 |
| 2012/0301585 | A1* | 11/2012 | Spirig | A21B 1/36<br>165/200 |
| 2014/0356496 | A1* | 12/2014 | Melnyczuk | A23B 2/425<br>426/523 |
| 2017/0122657 | A1* | 5/2017 | Giger | A23B 2/708 |
| 2021/0259454 | A1 | 8/2021 | Lee et al. | |
| 2023/0000117 | A1* | 1/2023 | Knoch | A23L 5/30 |
| 2023/0000177 | A1 | 1/2023 | Knoch | |
| 2024/0188600 | A1* | 6/2024 | Cheng | A23B 2/001 |

* cited by examiner

PRECISION TEMPERATURE AND MOISTURE CONTENT CONTROL FOR BATCH FOOD PRODUCTION USING A VACUUM SYSTEM

CROSS REFERENCES TO RELATED APPLICATIONS

This application relates to and claims priority from US Prov. Ser. No.: 63/589,188 filed Oct. 10, 2023, the entire contents of which are incorporated herein fully by reference.

FIGURE SELECTED FOR PUBLICATION

FIG. 1

BACKGROUND OF THE INVENTION

Field of the Invention

The present invention relates to, but not limited to, an apparatus, system, and methods to precisely control the temperature and moisture content of food products in an indirectly heated and agitated vessel with a vacuum system.

Description of the Related Art

Cooling and cooking under vacuum in jacketed and agitated vessels, such as kettles and industrial scale horizontal cookers, are common practices in the thermal processing of a wide range of food products. They are particularly popular in the batch production of high moisture content prepared foods like soups, sauces, and slurries.

Vacuum cooling is an evaporative process, in which a portion of the moisture in the food product boils off under vacuum. Since the latent heat required by the evaporation of water is supplied by the product itself, the temperature of the product drops and the cooling effect is achieved. It is an efficient and rapid way to cool high moisture content and high porosity products.

Vacuum cooking operates under the same principle. The only difference is that the latent heat required to boil off the moisture is supplied by an indirect heat source such as an associated jacket or heat exchanger. As a result, while the moisture content reduces, the product maintains its temperature at the boiling point corresponding to the vacuum level inside the vessel. The heating medium for the jacket is typically steam, water, or electric heating elements. Vacuum cooking is an efficient method to remove moisture without overcooking the food products. It also preserves desirable texture and flavors and significantly reduces undesired browning and burning.

In both vacuum cooling and vacuum cooking processes, the water vapor along with any condensable and non-condensable volatiles generated during the boiling process, and air leaked into the system, are removed by a condenser, or a series of condensers, in combination with a vacuum pump. In multi-stage vacuum systems, steam ejectors are often incorporated to reach deeper vacuum levels than a single vacuum pump can achieve. In this case, the additional steam added into the system through the ejector or ejectors is also removed by the same condensers and the vacuum pump.

Due to the evaporative nature of the vacuum cooking and vacuum cooling processes, as well as the difficulties in accurately measuring the product weight under vacuum, it is very challenging to reach both the final temperature and final moisture content targets and this leads to failures and irregularities. The current invention addresses these concerns by providing the assembly, system, and method adaptively and alternatively using a control algorithm to achieve both goals simultaneously.

There are three common scenarios. The first scenario is that the product is fully cooked with all its ingredients and needs to be vacuum cooled down to a particular final temperature and to reach a particular final moisture content. The water activity of the product at the final temperature and vacuum level may correspond to a moisture content level that is lower than its target. In this case, additional make-up water needs to be added before or during the vacuum cooling process. The second scenario is that the cooked product contains more moisture than the vacuum cooling process can remove after reaching the temperature target. In this case, a vacuum cooking process can be employed to achieve the final moisture content target. Jacket heating can be turned on at a preset vacuum level to boil off additional moisture. It is typically done at higher temperatures since moisture is easier to remove at higher temperatures due to its higher water activity. The third scenario is that vacuum cooking is deployed as a step in the cooking process to remove moisture and concentrate the product. The vessel can maintain at a vacuum level corresponding to the preset temperature and boil off the required amount of moisture. The current invention addresses all three scenarios.

In our evaluation of the related arts, both industrially as well as in patent records, we were unable to locate any systems that provide both temperature and moisture content control in agitated and heated vessels using a vacuum system.

Most vacuum cooking related inventions are for sous vide type cooking method, for example the inventions of Salvaro (U.S. Pat. No. 8,047,128B2), Kim (U.S. Pat. No. 7,012, 229B2), and Lee et al. (US20210259454A1), both incorporated herein fully by reference. The invention of Smaltz et al. (U.S. Pat. No. 2,203,638A), also incorporated herein fully by reference, describes vacuum cooking and cooling of pie fillings with thickening agents using a vacuum rated and steam jacketed kettle connected to a vacuum pump. The focus is to use this process to ensure the thickening agents are not separated from the fruit filings. There are no moisture content control methods such makeup water addition is mentioned. The vacuum level in the cooking and cooling process is also not controlled. It goes to the deepest level the onboard vacuum pump can pull.

The invention of Knock (US20230000117A1), which is also incorporated herein fully by reference, describes cooking a non-animal protein, High Moisture Extrusion (HME) food product in a tumbler under vacuum using direction steam injection. However, no moisture content control method is provided.

Most of the vacuum cooling inventions are focused on fresh produces or horticultural products, for example, the inventions of Floyd et al. (U.S. Pat. No. 5,290,580A) and Later et al. (U.S. Pat. No. 5,992,169A). The invention of Coffman (U.S. Pat. No. 3,304,733A) describes a vacuum cooling system equipped with a condensate recovery system to reintroduce the volatile compounds and water vapor back to the food products. But no moisture content control mechanism is included. The entire contents of each of the references above is incorporated herein fully by reference.

ASPECTS AND OBJECTS OF THE INVENTION

With knowledge of the aforementioned circumstances, the invention is based on the object of addressing one of the concerns noted.

One adaptive aspect or object of the present invention is to provide hardware apparatus, systems, and methods to control the temperature and moisture content of food products in an agitated and indirectly heated vessel equipped with a vacuum system: (i) To achieve both the desired temperature and moisture content targets using vacuum cooling, cooking or the combination of these two methods; (ii) To accelerate the vaporization of moisture in the food products without excessive browning, burning and degradation of nutrients subject to high temperatures; and (iii) To shorten the total process time.

One adaptive aspect or object of the present invention is to provide a hardware arrangement, system, and method that addresses at least one of the concerns noted herein.

Another adaptive aspect or object of the present invention is to provides the hardware arrangement, design, system and control algorithm to achieve both a final temperature and a final moisture control of a batch product in a vacuum cooking and a vacuum cooling process.

According to an alternative and adaptive method of the present invention, there is provided a hardware design and a method to precisely control the temperature and moisture content of food products in an agitated and indirectly heated vessel equipped with a vacuum system:

a. Consisting of a vacuum rated and agitated vessel with indirect heat supplied via a jacket, an outboard heat exchanger, or the combination of both. The heating medium of the jacket can be steam, hot water, or electric heating elements, among others.
b. Having an ability to manually or automatically agitate/mix/discharge.
c. A weighing system able to precisely measure the product weight under vacuum or at atmospheric conditions.
d. A precision water metering system consists of a flow meter and a modulating valve.
e. A single or multiple stage vacuum system.
f. An inter connected, operably connected, programmable Logic Controller (PLC) or an industrial computer, a suite of sensing devices to monitor product temperature, vessel vacuum pressure, product weight, jacket steam or water pressure, and control devices such as jacket steam valve or jacket electric heating controller and modulating air bleed valves.
g. A control algorithm to achieve both the desired temperature and moisture content targets using vacuum cooling, vacuum cooking or the combination of these two methods.
h. Ability to receive user inputs of temperature and moisture content targets and achieve them automatically using the hardware and control algorithm.
i. Ability to measure the thermal properties of the product during the cooling and cooking cycles and use the data to correct previously entered empirical or theoretical data and achieve more precise cooling loss estimation and moisture content control.
j. A balanced equipment mechanical design that minimizes the impact of the vacuum system on the product weighing system.
k. A vacuum cooking rate control technique to maximize the moisture removal rate, minimize carryover, and prevent excessive browning, burning and degradation of nutrients subject to high temperatures.
l. A vacuum cooling rate control method to maximize the vacuum cooling rate and minimize carryover to achieve the final temperature target.
m. A condensate collection and weighing system to measure product moisture loss.

According to another aspect and object of the present invention there is provided an apparatus, system, and method for a precision temperature and moisture content control for batch food production using an agitated and jacketed vessel equipped with a multi-stage and balanced vacuum system, an outboard heat exchanger system indirectly heats the vessel and accompanying, weighing, sensing, and controlling devices. A condensate collection and weight system is interlinked with processing control so as to allow a vacuum level within the system to be precisely controlled based on the weighing system to allow moisture removal and prevent overcooking in an automated vacuum cooling process, a vacuum cooking process, or a combination of a vacuum cooling and a vacuum cooking process.

According to one aspect of the present invention, there is provided a system, assembly and method to precisely control product temperature and moisture content in a batch production, comprising: a vacuum rated and agitated vessel with indirect heat supplied via a jacket, heat exchanger or the combination of both; the heating medium of the jacket can be steam, hot water, or electric heating elements, among others; an apparatus to operably manually or automatically agitate/mix/discharge a batch; a weighing system able to precisely measure the product weight under vacuum or at atmospheric conditions; a precision water metering system consists of a flow meter and a modulating valve; a single or multiple stage vacuum system consisting of a knockout pot, VFD equipped vacuum pump, condensers, heat exchangers and ejectors with on/off control; and an interconnected programmable Logic Controller (PLC) or an industrial computer, a suite of linked sensing devices to monitor product temperature, vessel vacuum pressure, product weight, jacket steam or water pressure, and control devices such jacket steam modulating valve or jacket electric heating controller and modulating air bleed valves.

According to another alternative and adaptive aspect of the present invention, there is provided a system, assembly and method to precisely control product temperature and moisture content in a batch production, comprising: The method to precisely control both the final temperature and moisture content includes the following steps: (i) build the water latent heat of vaporization vs a temperature correlation into a PLC or industrial computer with a numerical interpolation algorithm, (ii) build the product specific heat vs a moisture content correlation into the PLC or industrial computer with a numerical interpolation algorithm, the correlation being a product specific correlation, (iii) monitoring and collecting empirical vacuum pressure vs product boiling temperature data, (iv) build a phase diagram using the empirical data and program into the PLC or industrial computer either with a numerical interpolation algorithm or with an equation of the Clausius-Clapeyron equation type or one of its derivatives, such as the Antoine equation, fitted using the empirical data, this phase diagram is also product specific, (v) enter a product initial temperature, a moisture content and a final temperature and moisture content target via the Human Machine Interface (HMI) such as a program logic controller or industrial computer with a keyboard or touch screen with suitable process controls; (vi) wherein the built-in heat and mass balance equations in the PLC or industrial computer automatically predicts whether a certain amount of make-up water needs to be added in the vacuum cooling process or a vacuum cooking step is needed to boil off the additional moisture, wherein (a) if additional make-up water is required, the system will automatically calculate the necessary amount. The user can specify when to introduce the make-up water via HMI, the make-up will then be metered in using the onboard water metering system in the vacuum cooling process, (b) if a vacuum cooking step is needed, the system will automatically calculate the amount of moisture that needs to be boiled off the product, the user can specify at what temperature the vacuum cook step will be carried out via HMI, and (vii) the load cell weighing system will monitor the product weight reduction and terminate the vacuum cooking step once the weight target is reached.

According to another alternative and adaptive aspect of the present invention the batch production vessel used in this invention has isolation bellows on both sides of the plenum and a balanced vacuum plenum and duct design (See FIG. 2). The vacuum duct is independently supported and does not impart any load to the vessel. Compared with the traditional design of having vacuum pull from one side of the plenum or through a port on the vessel, the current symmetric plenum and duct design eliminates the force imbalance caused by the vacuum system. It allows the weighing system to accurately measure the product weight under vacuum or at atmospheric conditions.

According to another alternative and adaptive aspect of the present invention when the desired balanced vessel design cannot be achieved due to space limitations or other practical reasons, a secondary condensate capturing and weighing system can be added to the vacuum system to achieve the same goal (See FIGS. 3A, 3B). The condensate removed from the condensers and from the vacuum pump can be collected and weighed in a shared sump and accounted as the moisture loss from the product. For vacuum systems equipped with steam ejectors, the amount of steam added by the ejectors can be measured using steam flow meters and subtracted from the total amount weighed in the collection sump. The moisture loss measured in this setup is not as accurate, due to the vapor losses in different parts of the vacuum system, such as the knockout pot and vacuum ducts. However, one benefit of this setup is that it provides an essence recovery system. For some applications this may be a more desirable design.

According to another alternative and adaptive aspect of the present invention, the vacuum level inside the vessel can be controlled with the combination of vacuum pump speed, on/off control of ejectors, and modulating air bleed valves with a fast response control algorithm (See FIG. 4). Depending on the applications, the air bled into the system can be either ambient or filtered.

According to another alternative and adaptive aspect of the present invention, there is provided a method for operating a precision temperature and moisture content control system for batch food production in an indirectly heated and agitated vessel with a vacuum system, comprising the steps of: providing a horizontally agitated and jacketed vacuum cooking vessel for the batch food production, wherein the precision temperature and moisture content control system are operative to provide at least one of a vacuum cooling process, a vacuum cooking process, and a combination of the vacuum cooking process and the vacuum cooling process, wherein an operative access and sealing port on the cooking vessel provides a batch access to the cooking vessel, providing a vacuum system herein a vacuum is drawn on the cooking vessel, wherein the vacuum system is a balanced vacuum duct system having a common plenum extending from the cooking vessel and two oppositely positioned isolation bellows communicating with a vacuum source whereby the vacuum system prevents imparting a vacuum force imbalance on the cooking vessel, wherein the precision temperature and moisture content control system further comprises a water metering system providing a make-up water to the cooking vessel, and wherein a heat exchanger system is an outboard heat exchanger operative to provide an indirect heat to the cooking vessel, providing a condensate removal tank system operably linked to the vacuum system and the cooking vessel to receive condensate, providing a weighing system having a plurality of load cells operative to measure a product weight under a vacuum condition or an atmospheric condition during the vacuum cooking process, the vacuum cooking process, or the combination of the vacuum cooking process and the vacuum cooling process, providing an interlinked programmable logic controller (PLC) or an industrial computer system receiving operating data including weight data, moisture data, and vacuum data, building a water latent heat of vaporization vs. temperature correlation into the interlinked programable logic controller (PLC) or the industrial computer with a numerical interpolation algorithm, building a product specific heat vs. moisture content correlation into the interlinked programable logic controller (PLC) or the industrial computer with a numerical interpolation algorithm, collecting and storing an empirical vacuum pressure vs. product boiling temperature data and determining a phase diagram correlation using the empirical data and storing the phase boundaries into the interlinked programmable logic controller (PLC) or the industrial computer with a numerical interpolation algorithm, with an equation of the Clausius-Clapeyron equation type, or with an Antoine equation fitted using the empirical vacuum pressure vs. product boiling temperature data, entering and storing a product initial temperature, a moisture content, and a final temperature and moisture content target via a human-machine-interface (HMI) in the interlinked programable logic controller (PLC) or the industrial computer, determining, by built-in heat and mass balance equations stored in the interlinked programable logic controller (PLC) or the industrial computer, by automatic prediction whether a certain amount of make-up water needs to be added to the vacuum cooling process or the vacuum cooking process for the cooking vessel, operating the water metering system providing a make-up water to the cooking vessel to meet the certain amount of make-up water, and monitoring the a weighing system and the plurality of load cells and terminating the one of the vacuum cooking step, the vacuum cooling step, and the combination of the vacuum cooking and the vacuum cooling step.

According to another alternative and adaptive aspect of the present invention, there is provided a method wherein: the weight system and the plurality of load cells transit respective weight data to the programmable logic controller (PLC) or the industrial computer system.

According to another alternative and adaptive aspect of the present invention, there is provided a method wherein: the water metering system having a flow meter for measuring a flow of the water into the cooking vessel and a modulating valve that provides a measured flow rate of the water into the cooking vessel.

According to another alternative and adaptive aspect of the present invention, there is provided a method wherein: the heat exchanger system with the outboard heat exchanger employs a heating medium that is one of steam, hot water, electric heating elements, or a combination of two or more of steam, hot water, and heating elements.

According to another alternative and adaptive aspect of the present invention, there is provided a method wherein:

the cooking vessel further comprises: at least one agitator operative to mix the batch food, and one of a manual and an automatic discharge system to discharge the batch food.

Those of skill in this art, having appreciated the present invention and disclosure, and unless explicitly excluded or excluded per se or contradicting the concept of the invention, will recognize that the features or groups of features mentioned in the singular in each case, by way of example the load cells, vacuum cooking vessels, water metering systems, heat exchangers or other components in the assembly, system, and method may be present multiple times in the power semiconductor module according to the invention.

It goes without saying that the various configurations of the invention, irrespective of whether they are mentioned in connection with the proposed assembly or system or with the method, can be realized individually or in any combination in order to achieve improvements. In particular, the features mentioned and explained above and hereinafter are able to be used not only in the combinations indicated, but also in other combinations or by themselves, without departing from the scope of the present invention.

Further explanations of the invention, advantageous details and features will become apparent from the following description of the exemplary embodiments of the invention schematically illustrated in the figures or respective parts thereof.

The above and other aspects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
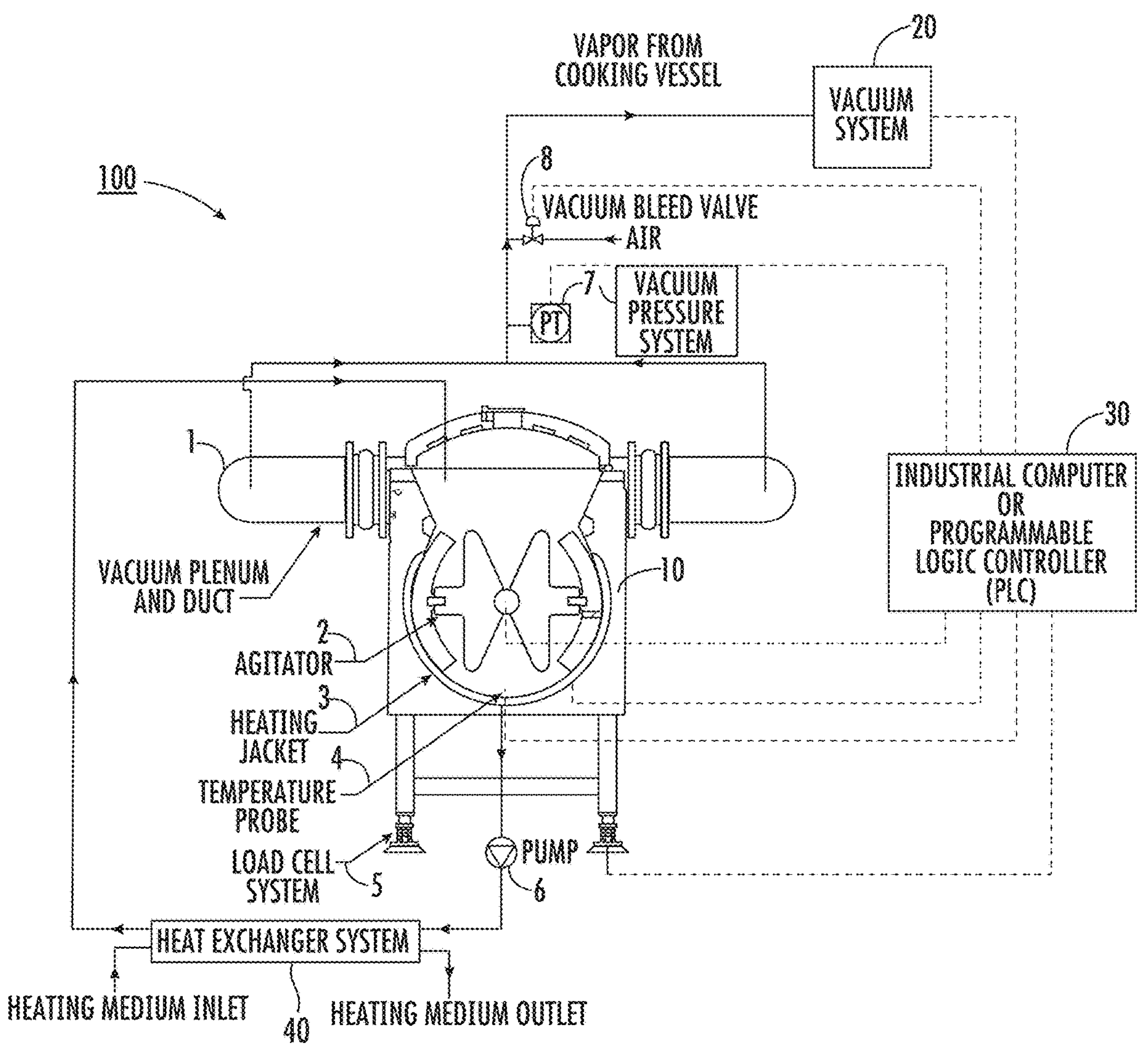
FIG. 1 is an example system setup that depicts an agitated and jacketed vessel equipped with a multistage vacuum system along with the accompanying sensing and controlling devices with the vessel shown in an illustrated sectional view as sectioned in FIG. 2.

Reference will now be made in detail to embodiments of the invention. Wherever possible, same or similar reference numerals are used in the drawings and the description refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

Various operations may be described as multiple discrete operations in turn, in a manner that may be helpful in understanding embodiments of the present invention; however, the order of description should not be construed to imply that these operations are order dependent.

Referring now to FIGS. 1 through 5, a precision temperature and moisture content control system 100 for patch food producing using a vacuum system 20 is discussed herein. Precision temperature and moisture content control system 100 includes a horizontally agitated and jacketed vacuum rated cooking vessel 10 with an operative access and sealing port 10' with indirect heat supplied via a heating system shown as a heating jacket 3 operable with a heat exchanger system 40 with respective heating medium inlets and outlets (shown but not numbered) and one or more heat exchangers 25 (See FIGS. 3A, 3B. The heating medium may be steam, hot water, electric heating elements, gas, or some combination thereof effective to operably provide heat to heat exchanger system 40.

Cooking vessel 10 includes an agitator 2, as shown, with a vacuum rated body and cover construction 11 (See FIG. 2) having an access port 12, shown on the top but may be in any convenient location. An operative temperature probe 4 may be embodied singularly or with multiple temperature probes and provides a thermal record to system 100 and heat exchanger system 40 as will be discussed. An illustrative pump system 6, containing one or more pumps links cooking vessel 10 with heat exchanger system 40 for thermal service (heating or cooling) as will be discussed. A load cell system 5, containing one or more individual and inter-linked load cells 5, is provided to receive a load measurement (e.g., weight) of component parts of system 100, including cooking vessel 10, condensate collection tank(s) 50 (See FIGS. 3B, 4), and other components such as vapor collection tanks 22 (See FIGS. 3A, 3B) with vacuum pressure transducers 23 for safety monitoring, as shown and as will be discussed. The individual vacuum pressure transducers 23 are within an illustrative operative vacuum pressure system 7 (FIG. 1), as will be discussed.

As will be noted, a programmable logic controller (PLC) or integrated industrial computer system 30 (e.g., PLC controller system 30) is provided inter operable and data connected throughout system 100, vessel 10, vacuum system 20, heat exchanger system 40, vacuum pressure system 7, and load cell system 5, as well as a condensate tank system 50, a precision water metering system 9 and a vacuum bleed system 8, as will be discussed.

Extending from vessel 10 is a vacuum plenum and duct system 1 having a respective bellows 1*a* on either side of a single common plenum 16 of vessel 10 (only one bellows is shown) allow the weighing system 5 to accurate measure product weight under vacuum or at atmospheric conductions without a force imbalance caused by vacuum pressure system 7.

Water metering system 9 includes one or more flow meters 9*a* and one or more respective flow modulating valves 9*b* allowing via linked PLC controller system 30 tracking of the flow of water.

Vacuum collection tanks 22 each have respective vacuum pressure transducers 23 that are understood to be interoperative linked with linked PLC controller system 30 for monitoring and tracking. As will be further appreciated in consideration of system 100, and variations of system 100 shown in FIGS. 3A, 3B, 4, condenser 27, 27' are linked with ejectors 24*a*, 24*b*, as will be discussed, and one or more steam flow meters 21 from a stem input flow (shown), and one or more condensate pumps 28 (shown singularly but multiple is contemplated) linked with condensate collection tank with load cell(s) 50 and one or more vapor separator tanks 29 operative joined with a liquid ring vacuum pump 26 (or series of pumps, only a single pump is shown). As will be understood by those of skill in this art having appreciated the entire disclosure the linked PLC controller system 30 (e.g., PLC or integrated industrial computer 30) in FIG. 1, each apparatus, system, or element provides integrated data that is stored in memory (understood as within hardware of PLC controller system 30 but not shown). The integrated data, as discussed below, will include but is not limited to the vapor pressure of a product, the pressure of one vessel 10 (and other vessels), temperatures of vessel 10 (and other temperatures) to allow controlling method calculation via the proposed algorithm and method as discussed herein and below. As a consequence of the disclosed system 100, including the operative components noted herein, it will be understood that the system includes further the ability to manually or automatically agitate/mix/discharge (via vessel 10, vacuum rated body and construction cover construction 11, and agitator 2); the ability, via weighing and load cell system 5, to precisely measure the product weight under vacuum or at atmospheric conditions; the ability via water metering system 9 to precisely control water application via flow meter(s) 9*a* and modulating valve(s) 9*b* (FIG. 2); that a single or multiple stage vacuum pressure system 7 (or vacuum system 7) (See FIGS. 1, 3A, 3B) includes interoperative equipped vacuum pumps 26, condensers 27, 27', heat exchangers 25, and ejectors 24, 24' with related controls (linking with program controller system 30); and that program logic controller system 30 (or an industrial computer 30) and a related suite of sensing devices (discussed here but not shown) linking to monitor product temperature, vessel vacuum pressure, product weight, jacket steam or water pressure, and control devices such as jacket steam modulating valves or jacket electric heating controllers and modulating air bleed valves (as will be understood by those of skill in this art having studied and appreciated the integrated present disclosure).

Figure 2:
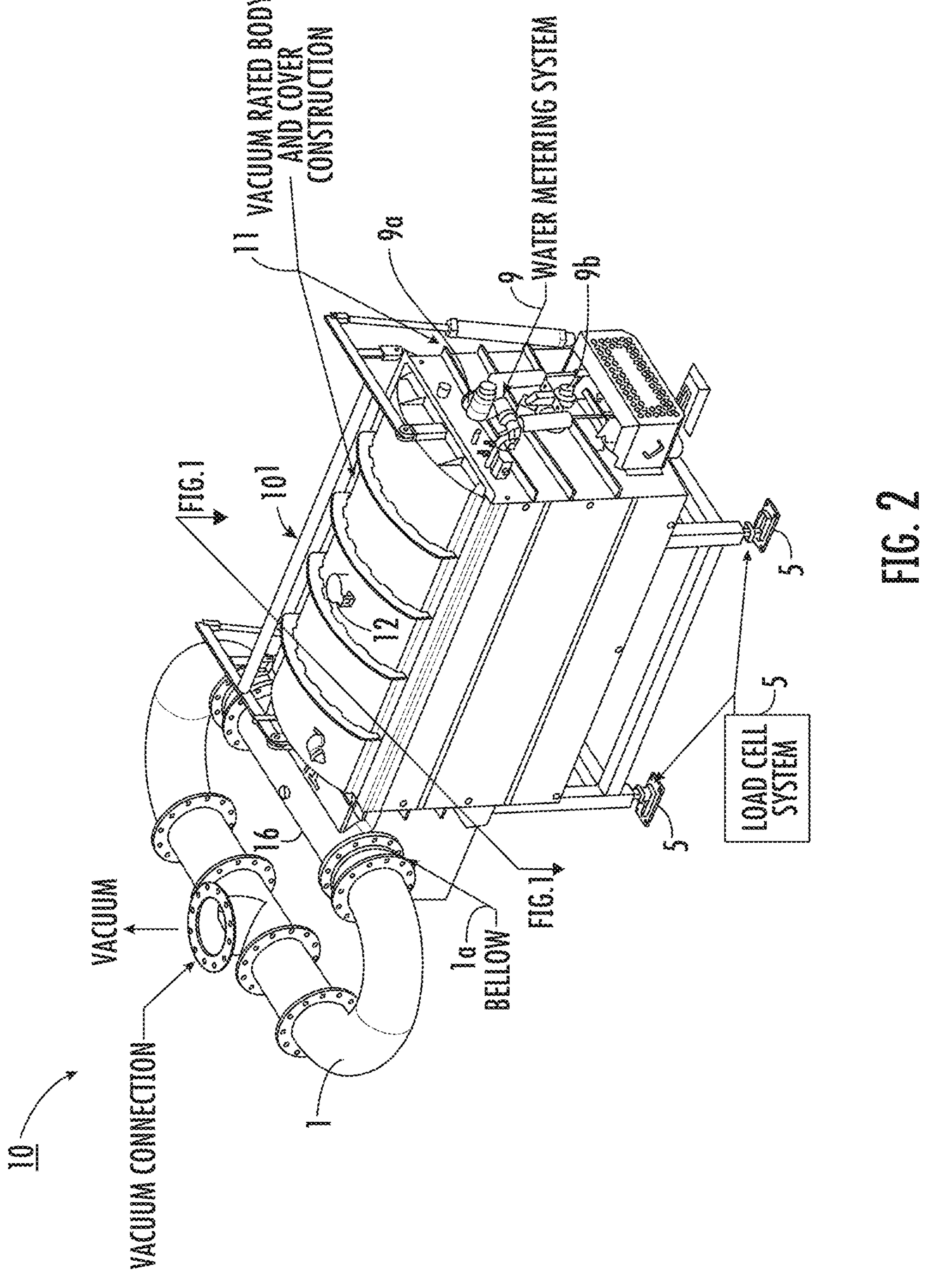
FIG. 2 is an example setup depicting a horizontally agitated and jacketed vessel with a load cell weighing system, make up water dosing system, and a balanced vacuum construction design to minimize the impact of the vacuum system on the weighing system.

Further referring now to FIG. 2, wherein the horizontally agitated and jacketed vacuum cooing vessel 10 includes the isolation bellows 1*a* (only one side is shown) on both sides of the plenum and a balanced vacuum plenum 16 and duct 1 design. The vacuum duct 1 is independently supported (via support elements, not shown but understood to those of skill in this art such as ceiling suspenders, or floor supports) and accordingly does not impart any load to the vessel 10. Compared with the traditional design of having vacuum pull from one side of the plenum or drawing a vacuum through a port on the vessel, the current symmetric plenum and duct design system 1 eliminates the force imbalance caused by the vacuum system. It allows the weighing system 5 via interconnected load cells (individually load cells 5) to accurately measure the product weight under vacuum or at atmospheric conditions.

Figure 3A:
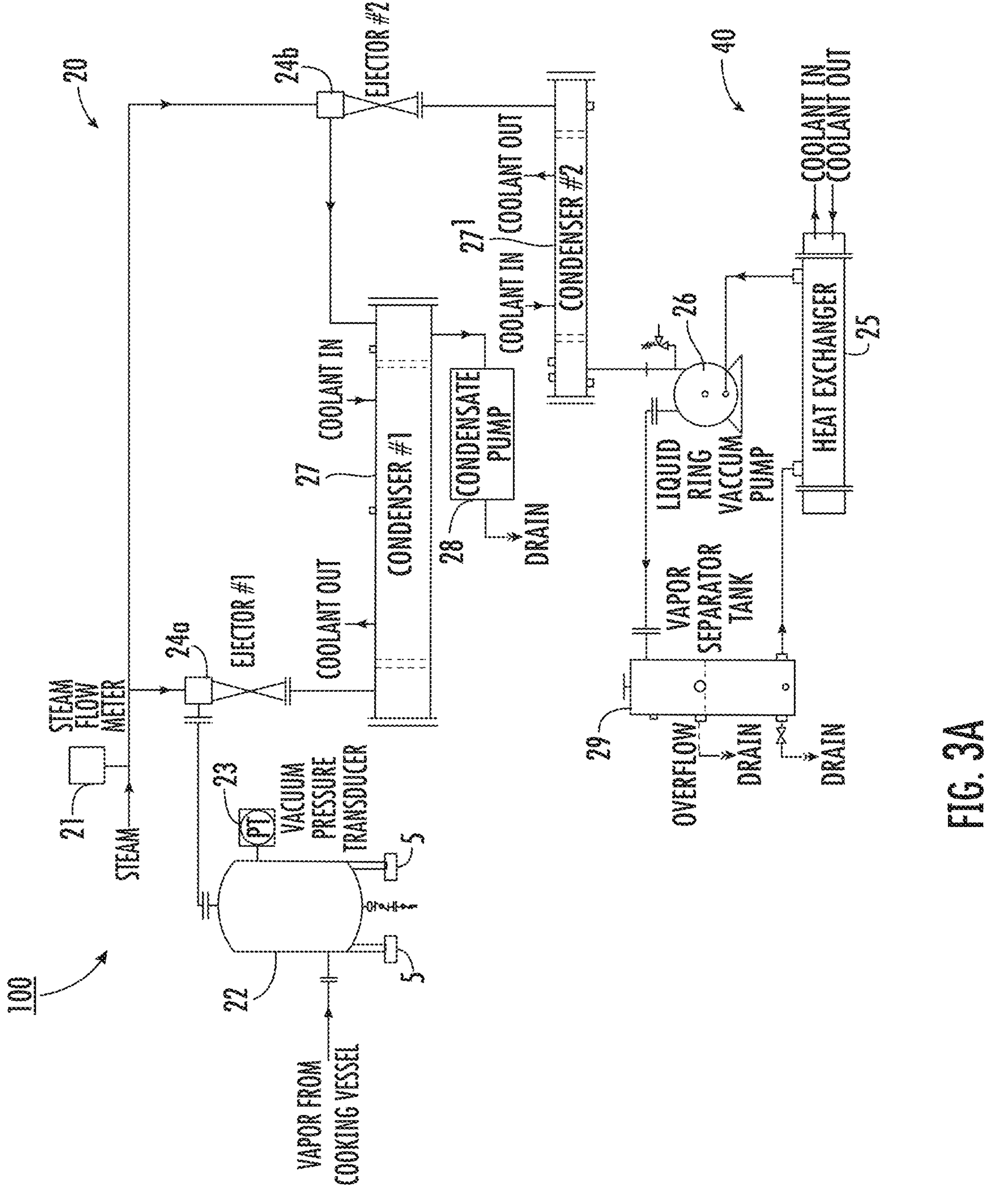
FIG. 3A is an example setup depicting a multi-stage vacuum system with steam ejectors.
Figure 3B:
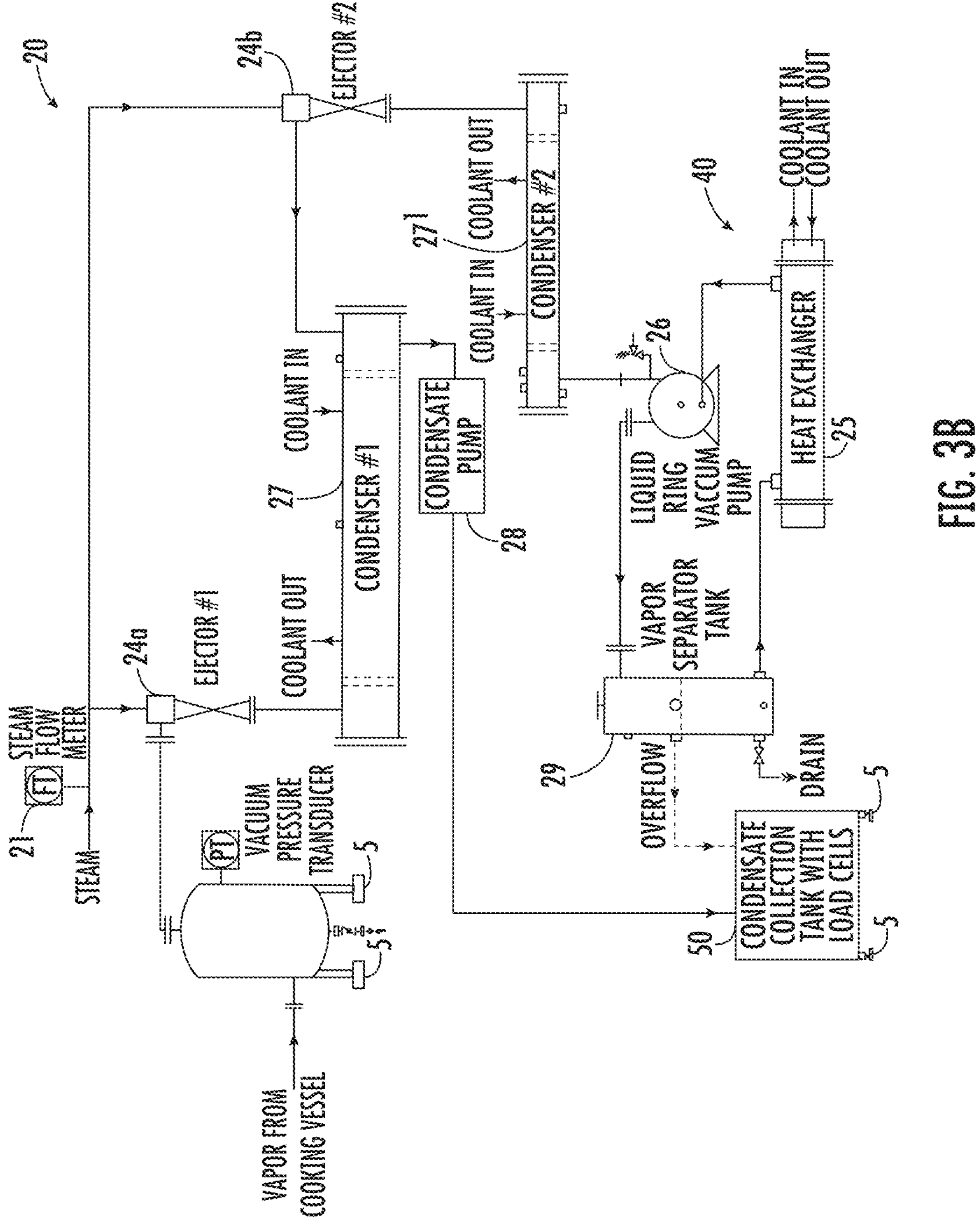
FIG. 3B is an example setup depicting a multi-stage vacuum system with condensate collection and weighing system, as well as ejector steam flow rate monitoring.

As will be further understood by those of skill in this art having appreciated the present disclosure, when a desired balanced vessel design cannot be achieved due to a space limitation or other practical reasons, a secondary condensate capturing and weighing system can be added to the vacuum system 1 to achieve the same goal (See FIG. 3B). Wherein, the condensate removed from the condensers 27, 27' and from the vacuum pump can be collected and weighed in a shared sump (see condensate collection tank system 50) and accounted as the moisture loss from the product. For vacuum systems 1 equipped with steam ejectors 24*a*, 24*b*, the amount of steam added by the ejectors 24*a*, 24*b* can be measured using steam flow meters and subtracted from the total amount weighed in the collection sump (condensate collection tank system 50). The moisture loss measured in this setup is not as accurate, due to the minor vapor losses in different parts of the vacuum system, such as the knockout pot and vacuum ducts. However, one benefit of this system and assembly is that it provides an essence or volatile recovery system. For some applications this may be a more desirable design depending upon the batch food being prepared.

Figure 4:
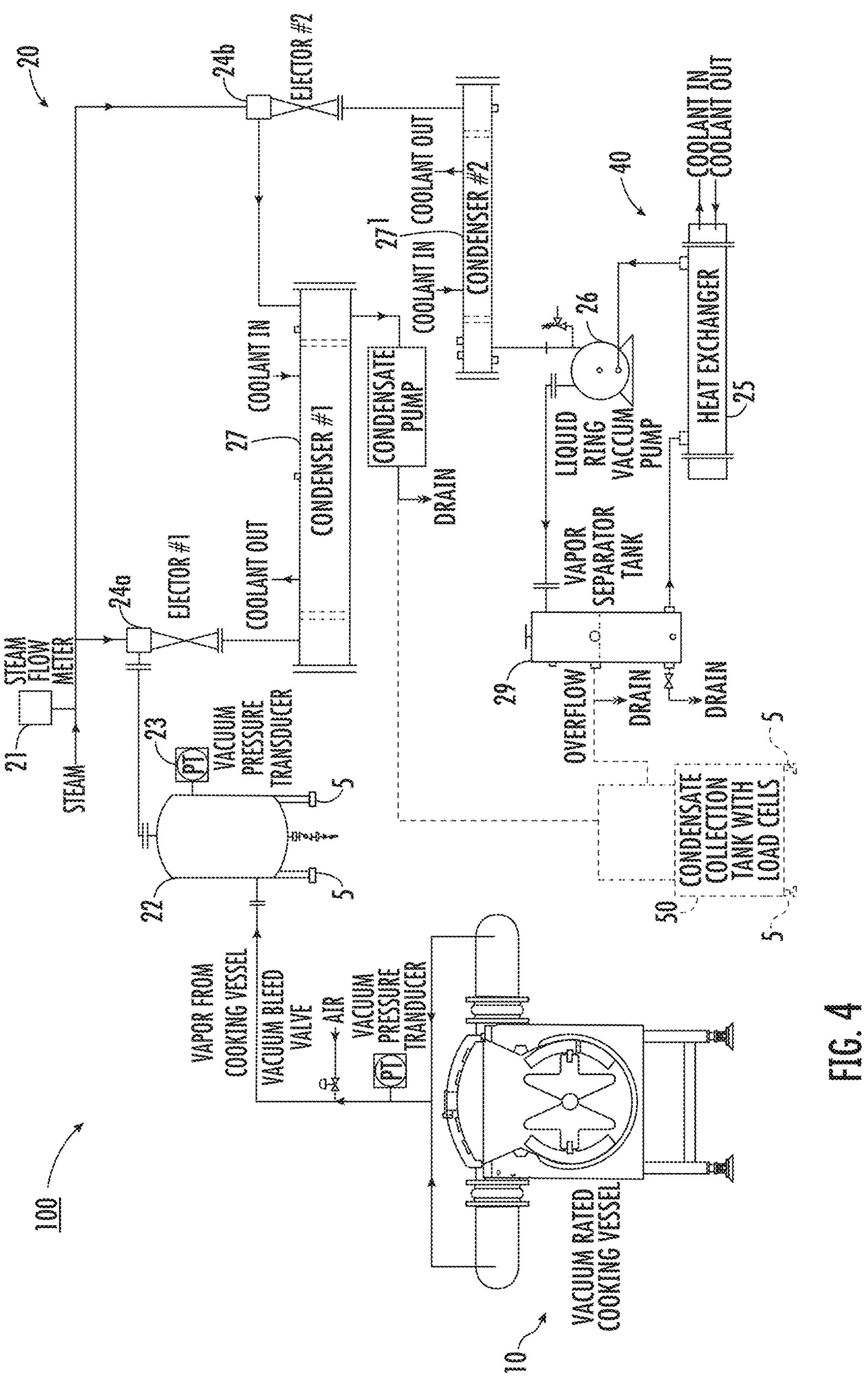
FIG. 4 depicts an example set up of an agitated and jacketed vessel equipped with a multistage vacuum system.

As will be appreciated by those of skill in this art having considered the entire disclosure and system 100, a vacuum level inside the vessel 10 can be controlled with the combination of vacuum pump speed, on/off control of ejectors, and modulating air bleed valves with a fast response control algorithm (discussed below) stored in programmable logic controller (PLC) 30 or industrial computer 30 (See FIG. 4). Depending on the applications, the air bled into the system 100 can be either ambient or filtered.

Figure 5:
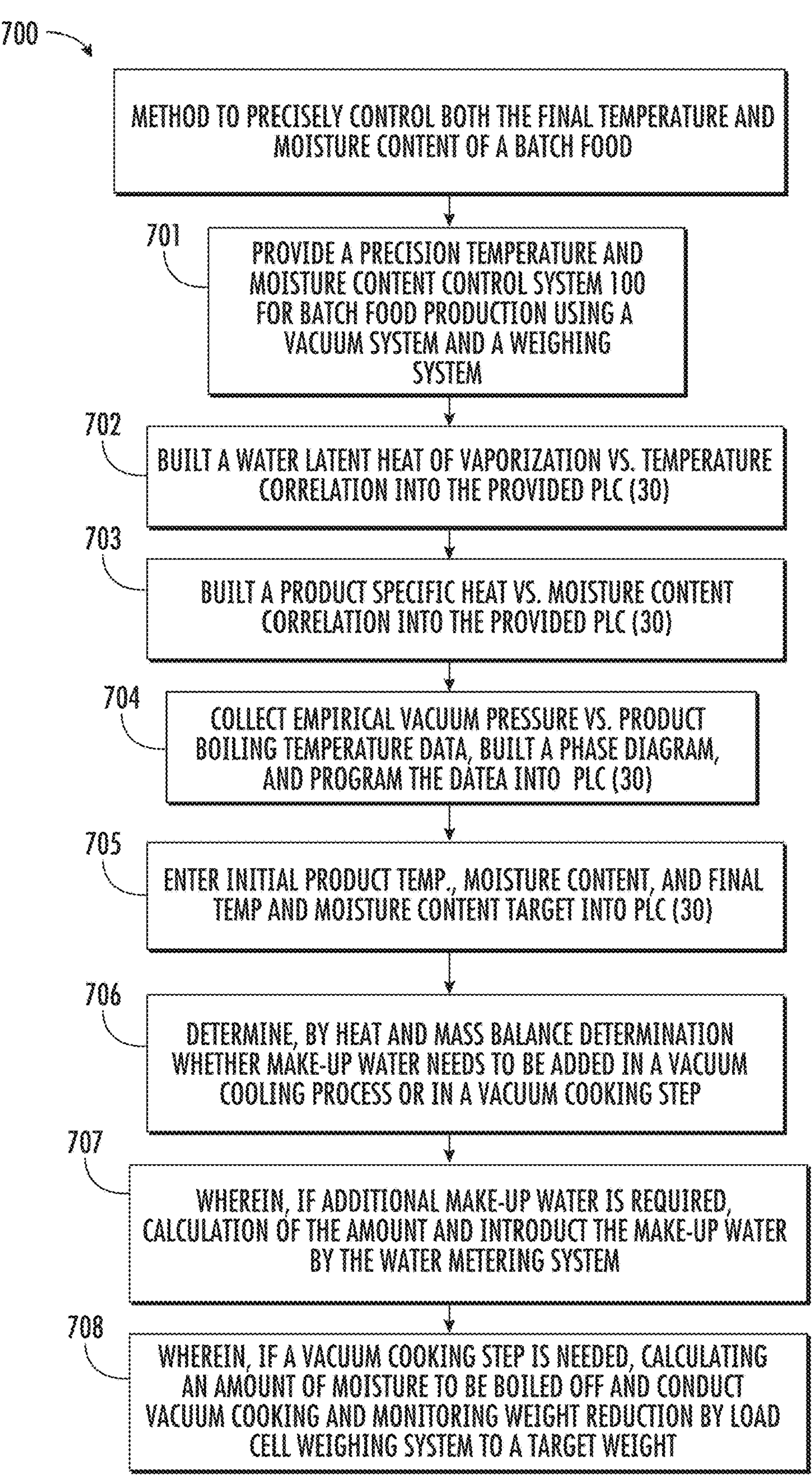
FIG. 5 is an illustrative flow chart of operating the proposed method with the system.

Based on the system 100 herein and related disclosure a method 700 is provided to precisely control both the final temperature and moisture content of a batch food according to the present invention, and includes, preferably, (as will be understood) the following steps for the system 100:

In a first step 701, provide a precision temperature and moisture content control system 100 for batch food products in a method 700 flow as shown in FIG. 5:

1—In a step 702—Build the water latent heat of vaporization vs temperature correlation into the PLC or industrial computer 30 with a numerical interpolation algorithm, as will be discussed below.

2—In a step 703—Build the product specific heat vs moisture content correlation into the PLC or industrial computer 30 with a numerical interpolation algorithm. This correlation is product specific.

3—In a step 704—Collect empirical vacuum pressure vs product boiling temperature data using sensor systems and sensors within system 100, for example as a distributed sensor array linking selected and optional components of system 100, and the related PLC or industrial computer 30. Build a phase diagram using the empirical data and program the phase diagram data and phase boundaries into the PLC or industrial computer 30 either with a numerical interpolation algorithm or with an equation of the Clausius-Clapeyron equation type or one of its derivatives, such as the Antoine equation, fitted using the empirical data. This phase diagram is also product specific.

4—In a step 705—Enter the product initial temperature, moisture content and the final temperature and moisture content target via the Human Machine Interface (HMI), e.g., a keyboard, data entry screen, or touch screen, for the PLC or industrial computer 30 for tracking of system 100.

5—In a step 706—Determine, via the provided built-in heat and mass balance equations in the PLC or industrial computer 30 automatically, by automatic prediction whether a certain amount of make-up water needs to be added in a vacuum cooling process or in a vacuum cooking step for the vessel 10 with vacuum system 20, heat exchanger system 40, and related elements in system 100 or if it is needed to boil off the additional moisture.

6—In a step 707—wherein if additional make-up water is required, the system 100 will automatically calculate the necessary amount of make-up water. The user can specify when to introduce the make-up water via HMI for the PLC or industrial computer 30. The make-up will then be metered in using the onboard water metering system 9 in the vacuum cooling process for vessel system 10.

7—In a step 708—wherein, if a vacuum cooking step is needed, the system 100 will automatically calculate the amount of moisture that needs to be boiled off the product. The user can specify at what temperature the vacuum cook step will be carried out via HMI for the PLC or industrial computer 30. The load cell weighing system 5 will monitor the product weight reduction and terminate the vacuum cooking step once the weight target is reached.

Those of skill in the art of the present invention and having appreciated the present disclosure will understand that uncontrolled, vigorous boiling during the vacuum cooling or vacuum cooking process can lead to the generation of large amount of vapor within the product, resulting in a rapid expansion of product volume. When such rapid expansion surpasses the capacity of the cooking vessel, product will be carried over to various components of the vacuum system 20, which is undesirable. This not only results in product loss but also diminishes the efficiency of vacuum system 20 efficiency, and in certain severer instances, may even lead to vacuum system 20 malfunction.

During vacuum cooking, the vacuum level is maintained at a preset value using the vacuum control algorithm for vacuum system 20. Jacket heat supply is modulated and monitored to ensure that the amount of vapor boiled off the product will not overwhelm the condenser or condensers 27, 27' in the vacuum system 20. It should also be kept at a level that carry-over will not occur.

A vacuum cooling rate control mechanism within vacuum system 20 also needs to be implemented to avoid product carryover while maximizing the cooling rate. For a given vacuum vessel, the rate of cooling ($\dot{q}_T$) is positively correlated to the difference between the vapor pressure of the product ($p_v$) and the pressure of the vessel ($p_c$) at a certain temperature (T).

$$\dot{q}_T \propto (p_v - p_c)_T$$

The product vapor pressure ($p_v$) vs temperature (T) data can be collected using a small amount of product in a bench top vacuum chamber. The resulting empirical data will then be used to build a $p_v$~T phase diagram in the PLC program or industrial computer 30, either by using a numerical interpolation algorithm or being fitted using a Clausius-Clapeyron type of relation such as the Antoine equation.

$$\mathrm{Log}_{10} p_v = A - \frac{B}{C + T}$$

This allows us to accurately predict the product vapor pressure at different temperatures. The rate of cooling is controlled by adjusting the pressure in the vessel 20 according to a predefined temperature dependent function (α) and the product vapor pressure that allows a rapid cooling rate while minimizing product carryover.

$$p_{c_T} = \alpha(T) p_v$$

The cooling rate therefore is directly proportional to the pressure difference $(p_v - p_c)_T$ at a given temperature.

$$\dot{q}_T \propto \alpha(T)(p_v - p_c)_T$$

Wherein α=α(T) is a temperature dependent control function that has a value between 0~100%. It can be defined as different types, such as linear, quadratic or step functions, and needs to be tested and optimized using full capacity product runs. Function a is considered to be optimized when product is vacuum cooled at the fastest cooling rate with minimal carryover.

The present invention for system 100 with the inventive method introduces automated processes to achieve both final temperature and moisture content targets by using vacuum cooling, vacuum cooking, or the combination of these two methods supported by the arrangement of system 100.

One alternative and adaptive embodiment of the present invention is to achieve precise temperature and moisture content control during the vacuum cooling process. Food products can be cooked to target temperature under atmospheric conditions to achieve the kill step (for safety and other reasons), and then vacuum cooled down to the target cooling temperature. Depending on the initial moisture content, the product will either require the addition of markup water or undergo a vacuum cooking process to remove additional moisture. Both the makeup water addition and the vacuum cooking processes are automated according to a preferred embodiment of the present invention as discussed herein; however, nothing will prevent the present apparatus and system 100 from being operated in portions or select steps (e.g., programming the program logic controller (PLC) or industrial computer 20, or other controllers in the related systems, such as vacuum system 20, water metering system 9, heat exchanger system 40, condensate tank system 50 or vacuum plenum and duct system 1, or any other system herein).

Another optional and adaptive embodiment of the present invention which will be appreciated by those of skill in this art having understood the entire invention, is operation of moisture removal and concentration for moisture rich products. The present invention offers precise and rapid moisture reduction by boiling under vacuum. It prevents overcooking, preserves desirable texture and flavors, and significantly reduces undesired browning and burning.

The above disclosure is sufficient to enable one of ordinary skill in the art to practice the invention, and provides a mode of practicing the invention. While this is a full and complete disclosure of the preferred embodiments of this invention, it does not limit the invention to the exact construction, dimensional relationships, and operations shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

As an example, it will be understood that program logic controller (PLC) or industrial computer 30 will include all needed route programing, memory (fixed and transitory) input controllers and display features necessary to operably conduct the method disclosed herein for system 100. As non-limiting examples related keyboards, sensor I/Os, program chips (individual or a plurality) and related updates for such systems as will be understood from the art.

Also, the inventors intend that only those claims which use the specific and exact phrase "means for" are intended to be interpreted under 35 USC 112. The structure, device, and arrangement herein is noted and well supported in the entire disclosure. Moreover, no limitations from the specification are intended to be read into any claims, unless those limitations are expressly included in the claims.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure covers modifications and variations of this disclosure provided they come within the scope of the appended claims and their equivalents.

Although only a few embodiments have been disclosed in detail above, other embodiments are possible and the inventors intend these to be encompassed within this specification. The specification describes certain technological solutions to solve the technical problems that are described expressly and inherently in this application. This disclosure describes embodiments, and the claims are intended to cover any modification or alternative or generalization of these embodiments which might be predictable to a person having ordinary skill in the art.

Therefore, the above description and illustrations should not be construed as limiting the scope of the invention, which is defined by the claims set out herein.

What is claimed is:

1. A method, for operating a precision temperature and moisture content control system for batch food production in an indirectly heated and agitated vessel with a vacuum system, comprising the steps of:

providing a horizontally agitated and jacketed vacuum cooking vessel for said batch food production;

wherein said precision temperature and moisture content control system are operative to provide at least one of a vacuum cooling process, a vacuum cooking process, and a combination of said vacuum cooking process and said vacuum cooling process;

wherein an operative access and sealing port on said cooking vessel provides a batch access to said cooking vessel;

providing a vacuum system herein a vacuum is drawn on said cooking vessel;

wherein said vacuum system is a balanced vacuum duct system having a common plenum extending from said cooking vessel and two oppositely positioned isolation bellows communicating with a vacuum source whereby said vacuum system prevents imparting a vacuum force imbalance on said cooking vessel;

wherein said precision temperature and moisture content control system further comprises a water metering system providing a make-up water to said cooking vessel; and wherein a heat exchanger system is an outboard heat exchanger operative to provide an indirect heat to said cooking vessel;

providing a condensate removal tank system operably linked to said vacuum system and said cooking vessel to receive condensate;

providing a weighing system having a plurality of load cells operative to measure a product weight under a vacuum condition or an atmospheric condition during said vacuum cooking process, said vacuum cooking process, or said combination of said vacuum cooking process and said vacuum cooling process;

providing an interlinked programmable logic controller (PLC) or an industrial computer system receiving operating data including weight data, moisture data, and vacuum data;

building a water latent heat of vaporization vs. temperature correlation into said interlinked programable logic controller (PLC) or said industrial computer with a numerical interpolation algorithm;

building a product specific heat vs. moisture content correlation into said interlinked programable logic controller (PLC) or said industrial computer with a numerical interpolation algorithm;

collecting and storing an empirical vacuum pressure vs. product boiling temperature data and determining a phase diagram correlation using said empirical data and storing said phase boundaries into said interlinked programable logic controller (PLC) or said industrial computer with a numerical interpolation algorithm, with an equation of the Clausius-Clapeyron equation type, or with an Antoine equation fitted using said empirical vacuum pressure vs. product boiling temperature data;

entering and storing a product initial temperature, a moisture content, and a final temperature and moisture content target via a human-machine-interface (HMI) in said interlinked programable logic controller (PLC) or said industrial computer;

determining, by built-in heat and mass balance equations stored in said interlinked programable logic controller (PLC) or said industrial computer, by automatic prediction whether a certain amount of make-up water needs to be added to said vacuum cooling process or said vacuum cooking process for said cooking vessel;

operating said water metering system providing a make-up water to said cooking vessel to meet said certain amount of make-up water; and monitoring said a weighing system and said plurality of load cells and terminating said one of said vacuum cooking step, said vacuum cooling step, and said combination of said vacuum cooking and said vacuum cooling step.

2. The method, according to claim 1, wherein:

said weight system and said plurality of load cells transit respective weight data to said programmable logic controller (PLC) or said industrial computer system.

3. The method, according to claim 2, wherein:

said water metering system having a flow meter for measuring a flow of said water into said cooking vessel and a modulating valve that provides a measured flow rate of said water into said cooking vessel.

4. The method, according to claim 3, wherein:

said heat exchanger system with said outboard heat exchanger employs a heating medium that is one of steam, hot water, electric heating elements, or a combination of two or more of steam, hot water, and heating elements.

5. The method, according to claim 1, wherein:

the cooking vessel further comprises:

at least one agitator operative to mix said batch food; and one of a manual and an automatic discharge system to discharge said batch food.

* * * * *